United States Patent

Nobusawa

[15] 3,636,842

[45] Jan. 25, 1972

[54] MEMORY-CONTROLLED AUTOMATIC SHUTTER TIMING NETWORK

[72] Inventor: Tsukumo Nobusawa, 255, Minamioizumi-machi, Nerima-ku, Tokyo-to, Japan

[22] Filed: June 26, 1969

[21] Appl. No.: 836,728

[30] Foreign Application Priority Data

July 3, 1968 Japan....................................43/45877
May 20, 1969 Japan....................................44/45802

[52] U.S. Cl. ....................................................95/10 CT
[51] Int. Cl. ....................................................G03b 9/62
[58] Field of Search ..........................................95/10 C

[56] References Cited

UNITED STATES PATENTS 3,324,779 6/1967 Nobusawa et al. ......................95/10 C
3,427,941 2/1969 Metzger ..................................95/10 C
3,460,450 8/1969 Ogihara ..................................95/10 C

*Primary Examiner*—Samuel S. Matthews
*Assistant Examiner*—Michael L. Gellner
*Attorney*—Stanley Wolder

[57] ABSTRACT

A memory-type shutter timing network comprises a solid-state switch controlling the shutter closure release and including a switching transistor and an emitter resistor. An RC network includes in series connection a variable resistor and a timing capacitor which is connected to the switch control input. A photoconductor and resistor are connected in series, and a memory capacitor connected through a camera controlled switch across the photoconductor is connected to the input of a transistor amplifier whose output is connected through the emitter resistor so that the switch triggering voltage is controlled by the memory capacitor charge and the switch input signal by the RC network.

9 Claims, 6 Drawing Figures

INVENTOR
TSUKUMO NOBUSAWA

INVENTOR
TSUKUMO NOBUSAWA

MEMORY-CONTROLLED AUTOMATIC SHUTTER TIMING NETWORK

BACKGROUND OF THE INVENTION

The present invention relates generally to improvements in light-responsive shutter control networks and it relates particularly to an improved shutter control network responsive to light measured before the opening of the shutter.

It is known to control an electric shutter with an RC timing circuit including a photoconductor acting as an object light-responsive element and a timing capacitor connected in series therewith, said RC timing circuit acting to control the shutter closure in response to the incident light value determination. When such electric shutter is employed in a single-lens reflex camera employing a through the lens (TTL) light measurement system where the photoconductor is placed in the path of the light passing through the camera objective, the objective light incident upon the photoconductor is stopped immediately before the starting of the shutter release. Therefore, it is necessary to temporarily memorize the object brightness condition at the moment immediately before carrying out the photographing operation at least during the time from immediately before the release action until completion thereof. For such memory operation the method of charging a capacitor is generally employed. The memorized information according to such method is an electrically stored value corresponding to the object brightness sensed by the photoconductor. Theoretically, such information may be stored in any form. However, some form of the stored information may require a very complicated structure of the electric shutter circuit to accomplish the exposure control in accordance with said stored information.

Accordingly, in conventional electric shutters having capacitor memory units the information is commonly temporarily memorized as the logarithmically transformed (logarithmically compressed) value of the electric input signal resulting from the sensing action of the photoconductor. When such logarithmic transformation is employed, however, for actual exposure control it is necessary to again transform the logarithmically transformed information into a signal according to geometrical a procession with common ratio 2 (logarithmic expansion) that is, wherein successive increments or terms are $2^1$, $2^2$, $2^3$, $2^4$—$2^n$. Therefore, a circuit is necessary for such logarithmic compression and logarithmic expansion. This would require a great increase in the number of such circuit elements as transistors, diodes, resistors, etc., for the electric shutter control network, and accordingly would make it difficult to install the device in a small portable camera body. Further, maintenance of the device is difficult because instability of the circuit would necessarily become greater due to the increase in the number of circuit elements, such instability being caused by the influence of ambient temperature and the increase of defective contacts due to increased junctions.

SUMMARY OF THE INVENTION

It is a principal object of the present invention to provide an improved light-responsive camera shutter control mechanism.

Another object of the present invention is to provide an improved shutter control network responsive to light conditions determined before the opening of the shutter.

Still another object of the present invention is to provide an improved shutter control network responsive to a temporarily stored electrical parameter which is a function of the incident light.

A further object of the present invention is to provide an improved memory controlled shutter control network in which logarithmic transformations are obviated.

Still a further object of the present invention is to provide an improved network of the above nature characterized by its reliability, accuracy, stability, simplicity, versatility and compactness.

The above and other objects of the present invention will become apparent from a reading of the following description taken in conjunction with the accompanying drawings which illustrate a preferred embodiment thereof.

In a sense the present invention contemplates the provision of a camera shutter control network comprising a memory capacitor, a photosensitive element, means for charging said memory capacitor an amount responsive to the light incident on said photosensitive element, a current control network having a varying input signal sensitivity responsive to the charge on said memory capacitor, a timing circuit having a time-varying output applied to the control input of said current control network, and shutter control means responsive to the output of said current control network. According to a preferred form of the improved network there is provided a shutter closure control solid-state switch network which includes a first transistor connected to a current source through an emitter resistor. An RC timing network includes in series connection a variable resistor and a timing capacitor which is coupled to the transistor control input. A light measuring network includes in series connection a resistor and a photoconductor, and a memory capacitor is connected across the photoconductor through a switch actuated by the camera shutter initiating mechanism. The memory capacitor is connected to the input of an amplifier whose output is connected to the current source through the first transistor emitter resistor.

DESCRIPTION OF THE PREFERRED EMBODIMENTS

Figure 1:
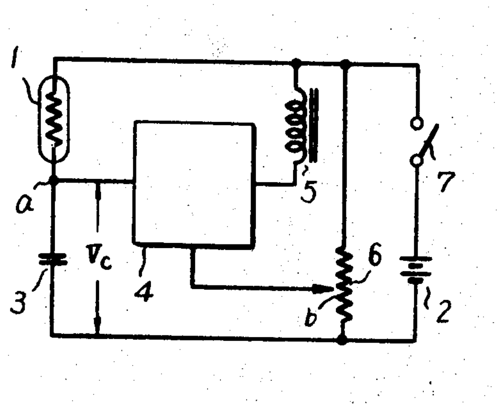
FIG-1 PRIOR ART
FIG. 1 is a circuit diagram of a conventional automatic shutter control network employing an externally exposed photocell.

Referring now to FIG. 1 which illustrates a conventional electric shutter, a photoconductor 1 which is located to receive light externally and functions as an object brightness sensing element, is connected in series with a timing capacitor 3 across a current source battery 2. A circuit network 4 is provided for controlling an electromagnetic device 5 which mechanically controls the opening and closing of the camera shutter, and consists, for example, of a switching circuit which acts in response to the voltage $Vc$ at the point $a$ of one terminal of timing capacitor 3. The resistance element of a potentiometer 6 is connected in parallel with the battery 2. Arrangement is so made that the voltages $V_1, V_2, \ldots, V_5$ of the point $b$ at the arm of potentiometer 6 causes a shift of the operation changeover point of circuit 4 in response to the voltage $Vc$ of the point $a$ of timing capacitor 3. The potentiometer is set in accordance with the sensitivity value of the film used. Further, a current source switch 7 is provided. Although not shown in the drawing, there are further provided a light measurement starting switch and a switch for starting a control operation in synchronism with start of the shutter release.

Figure 2:
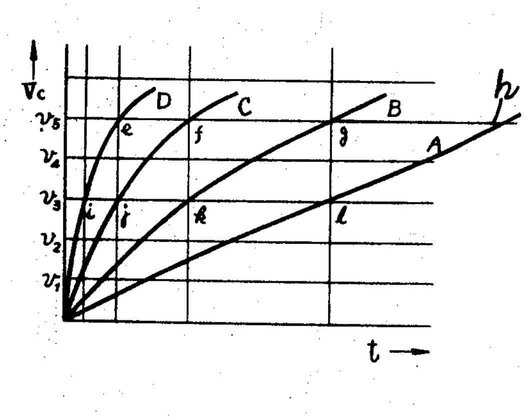
FIG-2 PRIOR ART
FIG. 2 is a graph illustrating the operational characteristics of the network of FIG. 1.

FIG. 2 is a graph showing the operation characteristics of the circuit of FIG. 1 where the input signal voltage to circuit 4 and the operation changeover point control voltage (the voltages $Vc$; $V_1, V_2, \ldots, V_5$) are plotted along the ordinate scale and the time $t$ is plotted along the abscissa scale. A, B, C, and D indicate the characteristic curves of the voltage $Vc$ at the point $a$ with respect to object brightness variation in geometrical procession with common ratio 2; while $e, f, g, h$ and $i, j, k, l$ indicate the operation changeover times of the circuit 4 under various operating conditions.

Figure 3:
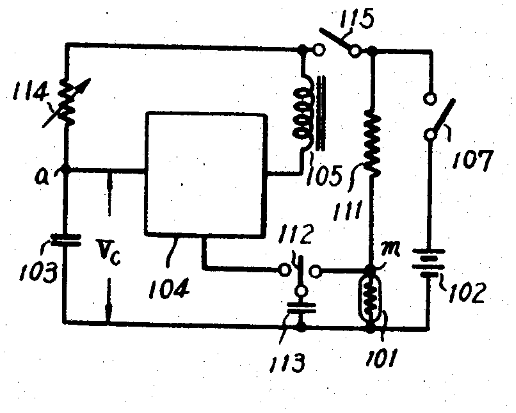
FIG. 3 is a circuit and block diagram of a network embodying the present invention.

Referring to FIG. 3 which illustrates an example of the shutter control network according to the present invention, a photoconductor 101, is connected in series with a resistor 111, across a current source battery 102. In parallel with the photoconductor 101 there is connected a memory capacitor 113 through one pole of a changeover switch 112. The other pole of changeover switch 112 is connected to an operation control circuit 104 of a shutter closure release electromagnetic device 105. Also connected to the input of circuit 104 is a voltage signal input $Vc$ derived from the junction $a$ of a film sensitivity setting variable resistor 114 and a timing capacitor 103 which are connected in series through series connected switches 115 and 107 to a battery 102. Current source switch 107 and control action starting switch 115 are closed in synchronism with the starting of the shutter release.

Figure 4:
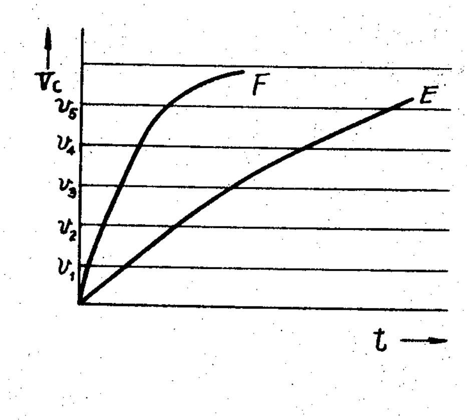
FIG. 4 is a graph illustrating the operational characteristics of the network of FIG. 3.

FIG. 4 is a graph showing the operation characteristic of the network shown in FIG. 3 where the operation changeover point voltages of the operation control circuit 104 (the voltage $Vc$ and the voltages $V_1, V_2, \ldots, V_5$ across the terminals of the memory capacitor 113) are plotted along the ordinate scale and the time $t$ is plotted along the abscissa scale. E and F are curves indicating the variation with time of the voltage $Vc$ across the terminals of the timing capacitor 103 with respect to variation in the adjusted value of the variable resistor 114.

In the conventional electric shutter as shown in FIG. 1, the characteristic of the RC timing circuit containing the capacitor 3, under control of the action of the photoconductor 1 due to the object brightness, is as follows:

The voltage $Vc$ at the point $a$ at the terminal of the capacitor 3 rises as with time $t$ according to the following relation:

$$Vc=E(1-e^{-t/RC}) \quad \text{(I)}$$

where $E$ is the operating voltage due to the battery 2 and $t$ the time. These voltage rise characteristics, corresponding to variations of the information signal provided by the photoconductor 1, are indicated by the curves A, B, C and D respectively, of FIG. 2.

The operation control circuit 4, for example a transistor switching network, of the electromagnetic device 5 for initiating the shutter closure, is so arranged as to perform a switch changeover operation when a suitable signal voltage is applied to the gate thereof. Accordingly, if the voltage $Vc$ is applied to the gate as the signal voltage reaches the operation changeover or switching of circuit 4, shutter closure initiation by the electromagnetic device 5 is effected. The operation changeover voltage is controlled by the voltage at the point $b$ ($V_1, V_2, \ldots, V_5$) determined by the adjustment of potentiometer 6 corresponding to the sensitivity value of the film.

Considering in detail the exposure time control by the above conventional automatic shutter in conjunction with the characteristic curves of FIG. 2; various information input signal voltages $Vc$ to the operation control circuit 4, as indicated by the characteristic curves A, B, C and D, are provided. If the operation changeover point voltage of circuit 4 is of value $V_5$, then the operation changeover of the circuit 4 is carried out at the times corresponding to the points $h, g, f, e$ where the characteristic curves A, B, C and D intersect the line of the voltage value $V_5$ respectively, thus closing the shutter. In the conventional arrangement as shown in FIG. 1, determination of the operation changeover point voltages $V_5, V_4, \ldots, V_1$ is accomplished by the adjustment of potentiometer such as in accordance with the sensitivity value of the film, whereby such value is introduced in the exposure time control operation.

When, due to an adjustment of potentiometer 6, the voltage of the point $b$ changes from $V_5$ to $V_3$, then, under the photographing conditions indicated by the characteristic curves A, B, C and D, at the times corresponding to the points $l, k, j$ and $i$ where the corresponding input signal voltages $Vc$ reach the voltage $V_3$, switching occurs in circuit 4 so that the electromagnetic device 5 is actuated to close the shutter. If the $RC$ timing circuit is so arranged as to provide information signals in geometric procession with a common ratio of 2 in response to object brightness change, then the time intervals of the points $h, g, f, e$ and $l, k, j, i$ of the characteristic curves will also change in geometric procession with common ratio 2. Further, the voltage value $V_3$ can be so selected with respect to the voltage value $V_5$ that, as shown in FIG. 2, the time intervals of the points $l, k, j$ and $i$ are shifted by one step with respect to those of the points $h, g, f$ and $e$. Under such conditions, the resistance value adjusting operations for the voltage values $V_5, V_4, \ldots, V_1$ may be performed in accordance with the sensitivity value of the film, thereby properly introducing the sensitivity parameter over a wide range in the exposure time control.

The operation changeover point control voltages ($V_5, V_4, \ldots, V_1$) must satisfy a certain condition for the above proper exposure control. From the relation (I) the time $t$ is:

$$t=RC\ ln(E/E-Vc) \quad \text{(II)}$$

($ln$: natural logarithm)

The physical meaning of equation (II) is as follows: The value $RC$ of the timing circuit determines the characteristic curves A, B, C, and D of FIG. 2, and the value $ln(E/E-Vc)$ determines the changeover point or switching voltages $V_5, V_4, \ldots, V_1$.

Accordingly, if $ln(E/E-Vc)$ is constant, a time interval control in geometric procession with common ratio 2 can be achieved with the value $RC$, while if the value $RC$ is constant, a time interval control can be made with the value of the voltages $V_5, V_4, \ldots, V_1$ according to the value $ln(E/E-Vc)$.

Let us consider now the time interval control with $ln(E/E-Vc)$. Then, from the above conditions, the voltages $V_5, V_4, \ldots, V_1$ can be determined as follows: $ln(E/E-Vc)$ must be of values which vary in geometric procession with common ratio 2. Let this be equal to $b$:

$$ln(E/E-Vc)=b \quad \text{(III)}$$

The input signal voltage $Vc$ may be so determined that, according to the relation (III), the value of $b$ varies in geometric procession with common ratio 2 of time (1 second, 0.5 second, 0.25 second, . . .). From the relation (III) it follows that:

$$Vc=E(1-e^{-b}) \quad \text{(IV)}$$

In accordance with the relation (IV), the switching voltages $V_5, V_4, \ldots, V_1$ may be determined corresponding to the input signal voltage $Vc$. In fact, in an arrangement adopting the external light-receiving light measurement system as shown in FIG. 1, the voltage of the point $b$ of the potentiometer 6 is determined in accordance with the above relation.

The following is an explanation of one example of the present invention as shown in FIG. 3 to which the condition of the input signal voltage $Vc$ and the operation changeover point voltage $V_5, V_4, \ldots, V_1$ is also applied. The input signal voltage $Vc$ is the voltage across the terminals of the timing capacitor 103 connected in series with the variable resistor 114 which is adjusted in accordance with the sensitivity value of the film. Accordingly, the following relation is established:

$$Vc=E(1-e^{-\frac{t}{R_1C_1}})$$

where $R_1$ is the value of the variable resistor 114 and $C_1$ is the capacitance of the timing capacitor 103.

When $E$ seconds or F seconds is selected as the value $R_1C_1$ of the timing circuit, then the time characteristic of the input signal voltage $Vc$ is shown by the characteristic curve $E$ or F in FIG. 4, respectively. These characteristic curves $E$ and F are, in connection with the operation control circuit 104, of the same nature as that of the characteristic curves A, B, C and D of FIG. 2. Thus, in the example of FIG. 4, a number of characteristic curves may be obtained corresponding to various sensitivity values of the film by adjusting the value of the variable resistor 114.

Let us assume that the characteristic curve $E$ of FIG. 4 is obtained when the sensitivity value of the film is ASA 100. In the example of FIG. 3 under this condition, when the current source switch 107 is closed, a current flows through a voltage divider circuit containing resistor 111 and photoconductor 101 connected in series with each other and at the injunction $m$ there is produced a voltage:

$$V_G=(R_{Cds}/R_{Cds}+r)E$$

which is a divided voltage of the voltage $E$ of the current source battery 102 due to the resistance value $R_{Cds}$ of photoconductor 101 corresponding to the object brightness and the value $r$ of resistor 111. When the changeover switch 112 is closed to the side of the junction $m$, the divided voltage $V_G$ is applied to the memory capacitor 113 so that the capacitor 113 is charged until the voltage across the terminals thereof reaches the value $V_G$. Upon operation of the changeover switch 112 at the time of shutter release, the voltage across its terminals is applied to circuit 104 as the operation changeover point voltages $V_5, V_4, \ldots, V_1$.

The divided voltage $V_G$ decreases as the object becomes brighter. Therefore, as the changeover voltages $V_5, V_4, \ldots, V_1$ of the conventional external light receiving type arrangement of FIG. 2, on the ordinate axis it gradually approaches the origin, resulting in gradually diminishing time on the abscissa axis.

In the relation $V_G=(R_{Cds}/R_{Cds}+r)E$, generally, $R_{Cds}=R_o 2^{-b\gamma}$ where $R_o$ is the dark resistance of the photoconductor 101, $b$ is a natural or real positive number and $\gamma$ is the resistance diminishing rate of the photoconductor 101.

When it is assumed that $\gamma=1$, then $$R_{Cds}=R_o 2^{-b},$$

therefore $$V_G=\frac{R_o 2^{-b}}{R_o 2^{-b}+r}E=\frac{1}{1+\frac{r}{R_o}2^{b}}E$$

If it is assumed that $r=R_o$, then $$V_G=(E/1+2^b)E.$$

In the above relation, when $b$ increases to some degree, then $$2^b>>1$$

so that approximately it may be stated that $$V_G=2^{-b}E \qquad \text{(V)}$$

The relation (V) indicates that the divided voltage $V_G$, namely the changeover voltages $V_5, V_4, \ldots, V_1$, is in geometric procession with common ratio 2.

The operation of the improved network is as follows:

Upon closing of switch 115 prior to the shutter release, the electromagnetic device 105 so operates under control of circuit 104 that it prevents the shutter from closing. Then, the following release actuating operation opens the shutter and in synchronism therewith the timing capacitor 103 starts to be charged under the control of the variable resistor 114 so that the input signal voltage $Vc$ varies with the time characteristic as indicated by the characteristic curve $E$ of FIG. 4.

On the other hand, simultaneously with said closing of the switch 115 prior to release operation, the switch 112 is changed over to the side of circuit 104. To the circuit 104 are applied the operation changeover point voltages $V_5, V_4, \ldots, V_1$ (the divided voltage $V_G$, for example, the voltage $V_3$ of FIG. 4) which varies in geometric procession with common ratio 2 in response to the object brightness. When the input signal voltage $Vc$ reaches changeover voltage $V_3$, a control changeover is effected so that the electromagnetic device ceases its shutter closure preventing action. Thus, an exposure control operation is performed in such a manner that the shutter continues to be open from the moment of shutter opening to the time of changeover of circuit 104.

Considering the changeover voltage $V_{G1}$ of an external light-receiving type light measurement system electric shutter; in the relation (II): $t=RC\,ln(E/E-Vc)$ substitute $Vc=V_{G1}$ and let $$ln(E/E-V_{G1})=2^{-b}.$$

Then, let $2^{-b}$ be equal to $k$, then from the above relation $$lk=(E/E-V_{G1}).$$

From this relation $V_{G1}$ is:

$$V_{G1}=E(1-e^{-k}).$$

If $k<<1$, then $e^{-k}=1-k$, so that $$V_{G1}=E(1-1+k)=Ek$$

Therefore $\quad V_{G1}=2^{-b}E \qquad \text{(VI)}$

Thus, with an external light-receiving type light measurement system electric shutter, the operation changeover point voltage $V_{G1}$ is of the value as indicated by the relation (VI). Further, when we compare this voltage $V_{G1}$ with the operation changeover point voltage $V_G$ of the improved network of the present invention as given in the relation (V), we have $$V_{G1}=V_G.$$

Accordingly, the changeover voltage $V_{G1}$ of the external light-receiving type light measurement system electric shutter is equal to the changeover voltage $V_G$ of the internal light-receiving type light measurement system electric shutter of the present invention. Therefore, whatever memory unit may be employed in the shutter of the present invention, the information signal to be memorized can be handled in the same manner as that of the external light-receiving light measurement system, so that it is not necessary to perform a logarithmic transformation in the memorizing operation.

Thus, with the improved network proper exposure is achieved in accordance with photographing parameters such as object brightness, the sensitivity of the film etc., and further, with the memorizing network in a through-the-lens-type light measurement system, it is not necessary to provide an information logarithmic transformation section, thus providing important practical advantages.

When the charged memory capacitor is connected directly to the control circuit consisting of a transistor switching network in such a manner that the voltage of the capacitor serves to control the bias voltage and hence the changeover point of the control circuit, the working effect of the control circuit, per se, is apt to decrease, since the electric current flowing into the memory capacitor is influenced by the switching on of the control circuit or the control circuit should have a broad range and adjustable changeover point.

Figure 5:
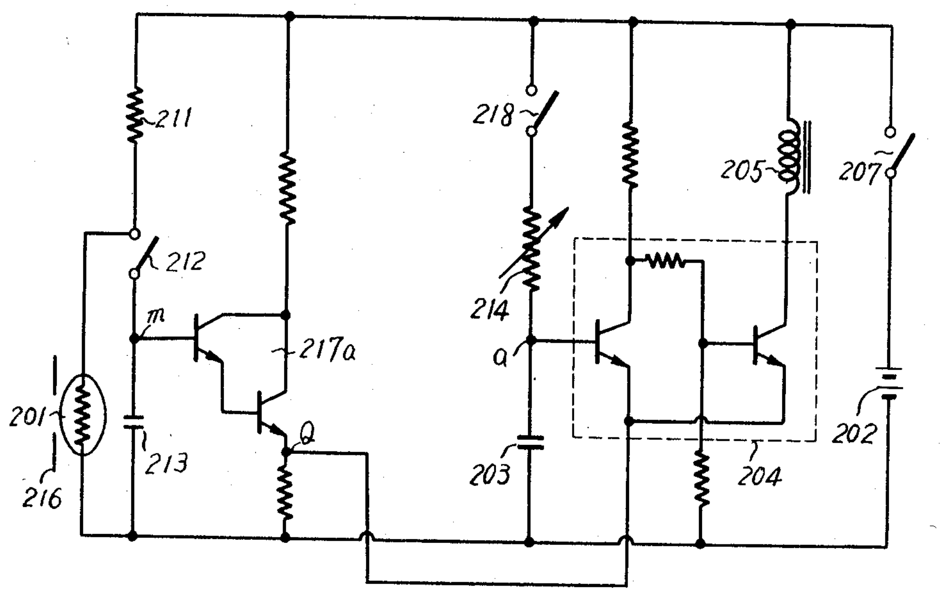
FIG. 5 is a circuit diagram of a specific preferred embodiment of the present invention.
Figure 6:
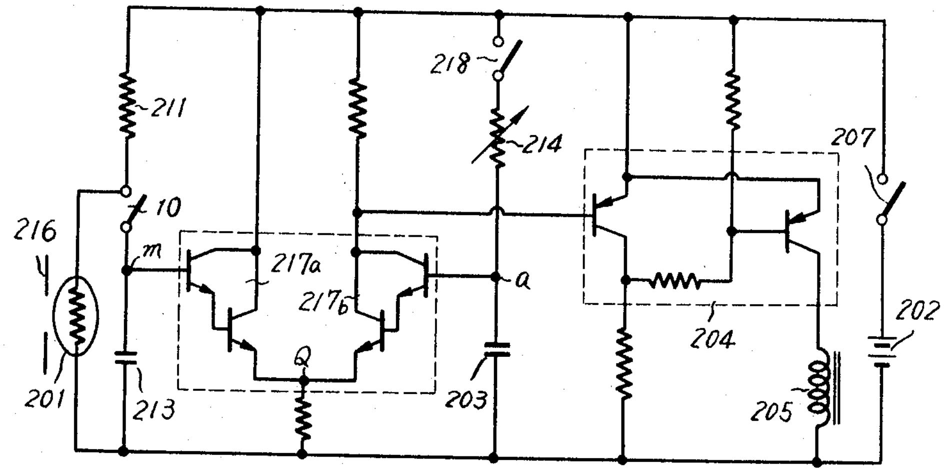
FIG. 6 is a circuit diagram of another embodiment thereof.

According to the embodiment of the present invention illustrated in FIG. 5 and FIG. 6, if the light-sensitive element 201 faces the object field while the current source switch 207 is closed, the light from the object field is incident on its light-receiving surface. If necessary an adjustable aperture diaphragm device 216 is arranged in front of light-sensitive element 201 and can be controlled in accordance with the predetermined diaphragm value of the camera or the ASA value of the film used, in order to attenuate such incident light in accordance with the above-mentioned values. The light-sensitive element 201, receiving such light from the object field, together with the resistance 211, controls current in the photocurrent circuit in accordance with the object brightness and charges the memory capacitor 213 an amount corresponding to the object brightness through the closed switch 212. Therefore, the voltage corresponding to the object brightness is produced at the output end Q of a Darlington circuit 217a having a control input terminal connected to point $m$ at one terminal of capacitor 203. Since transistor circuit 217a is of high input impedance, the voltage at point $m$ is kept stable due to the charge on capacitor 213 even if the switch 212 is opened. Accordingly, the voltage at the output end Q is also kept stable.

If switch 212 is opened immediately before shutter the release and the synchronous switch 218 is closed synchronously with the start of the shutter opening action caused by the start of the shutter release, the voltage at the connection point $a$ of the timing circuit, consisting of a variable resistance 214 whose resistance value is adjusted in accordance with the *ASA* value of the film used or the preset diaphragm value, etc., and condenser 213, increases with time. It is known that the operation control circuit 204 consisting of the transistor switching circuit having a control pole receiving voltage produced at said connection point $a$ in such a timing circuit discontinues to conduct current, when the difference between the voltage of the emitter connected to the output end Q and the voltage at said connection point $a$ reach a predetermined value. Accordingly, the electromagnet 205 preventing the closing action of the shutter by means of the current flow therein, ceases its shutter closure preventing action, so that the shutter is closed.

Considering the embodiment illustrated in FIG. 6, the output end Q of a Darlington transistor circuit 217*a* controlled by a voltage produced at its input terminal *m* serves also as the emitter connection point of the Darlington transistor circuit 217*b*. As the base control terminal of Darlington circuit 217*b* is connected to the connection point *a* of the timing circuit, the collector voltage of transistor circuit 217*b* varies in accordance with an increase in voltage at point *a* of the timing circuit under the influence of the emitter following action, by a voltage corresponding to the object brightness which the capacitor 203 has memorized.

Thus, circuit 204 controlled by the collector voltage of transistor circuit 217*b* discontinues to conduct current and ceases to supply the electromagnet 205 with electricity, so that the shutter closure is initiated.

In the above network, a switching circuit is employed as the operation control circuit. For this purpose, however, a differential amplification circuit or an amplitude comparison circuit may also be employed. The changeover switch may be replaced by a simple switch for stopping the flow into the memory capacitor of photocurrent upon the shutter release action. Further, in the photocurrent circuit there may be inserted a photocurrent sensing load such as an ammeter and the film sensitivity parameter may be introduced, by a mechanical coupling, in the displacement amount in response to the photocurrent of the load such as the displacement of the pointer, so that the ammeter may serve as an exposure time indicating means.

While there have been described and illustrated preferred embodiments of the present invention, it is apparent that numerous alterations, omissions and additions may be made without departing from the spirit thereof.

What is claimed is:

1. A camera shutter control network comprising a memory capacitor, a photosensitive element, means for charging said memory capacitor an amount responsive to the light incident on said photosensitive element, a current control network having a varying input signal sensitivity responsive to the charge on said memory capacitor, a timing circuit having a time-varying output independent of said incident light applied to the control input of said current control network, and shutter control means responsive to the output of said current control network.

2. The network of claim 1 wherein said photosensitive element comprises a photoconductor and said charging means comprises a voltage divider including a resistor and said photoconductor as sections thereof, and means for connecting said memory capacitor across one of said voltage dividing sections.

3. The network of claim 1 wherein said photosensitive element comprises a photoconductor and said charging means comprises a voltage divider including a resistor and said photoconductor as sections thereof, and means actuated with an operational sequence of said camera for connecting and disconnecting said memory capacitor across said photoconductor.

4. The network of claim 1 wherein said timing circuit comprises a timing capacitor section and a resistor section connected to said timing capacitor one of said sections being coupled to said current control network input.

5. The network of claim 4 wherein said resistor is variable.

6. The network of claim 5, including a voltage supply, said resistor and timing capacitor being connected in series and said capacitor being connected to said switch input, and means for connecting said resistor and timing capacitor across said voltage supply.

7. The network of claim 1 wherein said current control network comprises a solid-state switch including a first transistor and an emitter resistor connected in series with the emitter of said first transistor, said timing circuit output being coupled to the base of said first transistor, and including means for applying a current through said emitter resistor in response to the charge on said memory capacitor.

8. A camera shutter control network comprising a memory capacitor, a photosensitive element, means for charging said memory capacitor an amount responsive to the light incident on said photosensitive element, a current control network having a varying input signal sensitivity responsive to the charge on said memory capacitor and including a first transistor and an emitter resistor connected in series with the emitter of said first transistor, a timing circuit having a time-varying output coupled to the base of said first transistor, a solid-state amplifier including an input connected across said memory capacitor and an output connected through said emitter resistor, and a shutter control means responsive to the output of said current control network.

9. An electric shutter having a memorizing unit characterized in that, in a camera employing a through-the-lens light measurement system and having a photoconductor to which the incident light is blocked upon shutter release action as an object brightness sensing element, information signals produced by a RC timing circuit in response to photographic conditions independent of said object brightness are applied to a circuit for controlling the operation of an electromagnetic device for initiating shutter closing operation, while the changeover point voltages of the said control circuit vary in response to the voltage across the terminals of a memory capacitor having charge corresponding to the object brightness.

* * * * *

UNITED STATES PATENT OFFICE
CERTIFICATE OF CORRECTION

Patent No. 3,636,842 Dated January 25, 1972

Inventor(s) Tsukumo Nobusawa

It is certified that error appears in the above-identified patent and that said Letters Patent are hereby corrected as shown below:

-- Assignee: Asahi Kogaku Kogyo Kabushiki Kaisha --

Signed and sealed this 3rd day of October 1972.

(SEAL)
Attest:

EDWARD M.FLETCHER,JR.
Attesting Officer

ROBERT GOTTSCHALK
Commissioner of Patents